United States Patent
Wang et al.

(10) Patent No.: US 7,101,961 B2
(45) Date of Patent: Sep. 5, 2006

(54) METHOD FOR PREPARATION OF POLY(O-PHENYLENEDIAMINE) NANO-BELT

(75) Inventors: Erkang Wang, Changchun (CN); Xuping Sun, Changchun (CN); Shaojun Dong, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 0 days.

(21) Appl. No.: 11/149,868

(22) Filed: Jun. 10, 2005

(65) Prior Publication Data

US 2005/0277757 A1 Dec. 15, 2005

(30) Foreign Application Priority Data

Jun. 15, 2004 (CN) .................. 2004 1 00109212

(51) Int. Cl.
 *C08G 73/00* (2006.01)
 *C08G 18/00* (2006.01)
(52) U.S. Cl. .............. 528/422; 528/490; 524/779; 524/785
(58) Field of Classification Search ........... 528/422, 528/490; 524/779, 785
 See application file for complete search history.

(56) References Cited

U.S. PATENT DOCUMENTS

2003/0113611 A1* 6/2003 Abe et al. ................. 429/43
2004/0265692 A1* 12/2004 Long et al. ................ 429/223

OTHER PUBLICATIONS

Sun, X. et al. (2004) "Large scale, templateless, surfactantless route to rapid synthesis of uniform poly(o-phenylenediamine) nanobelts" *Chem. Commun.*, pp. 1182-1183.

Cai, Z. et al. (1991) "Molecular and supermolecular origins of enhanced electronic conductivity in template-synthesized polyheterocyclic fibrils. 1. supermolecular effects" *Chem. Mater.* 3:960-967.

Cai, Z. et al. (1989) "Electronically conductive poymer fibers with mesoscopic diameters show enhanced electronic conductivities" *J. Am. Chem. Soc.* 111:4138-4139.

Cepak, V. et al. (1999) "Preparation of polymeric micro- and nanostructures using a template-based deposition method" *Chem. Mater.* 11:1363-1367.

Jang J. et al. (2003) "Facile fabrication of polypyrrole nanotubes using reverse microemulsion polymerization" *Chem. Commun.* pp. 720-721.

Martin, C. et al. (1990) "Template synthesis of organic microtubules" *J. Am. Chem. Soc.* 112:8976-8977.

(Continued)

*Primary Examiner*—Samuel A. Acquah
(74) *Attorney, Agent, or Firm*—Knobbe, Martens, Olson & Bear, LLP

(57) ABSTRACT

The present invention provides a method for preparation of poly(o-phenylenediamine) nano-belt comprising mixing aqueous solutions of o-phenylenediamine and of oxidant in a mole ratio of 1:0.1–1 under stirring; standing for 0.5–2 hrs at room temperature; and obtaining poly(o-phenylenediamine) nano-belt. The method is suitable for large-scale production. In the absence of template and surfactant, aqueous solutions of o-phenylenediamine and of oxidant are mixed in a specified mole ratio and thus obtain a poly(o-phenylenediamine) nano-belt with length of several hundred micrometers, width of several hundred nanometers and thickness of tens nanometers. The method is simple, quick and suitable for large-scale manufacture. The poly(o-phenylenediamine) nano-belt thus prepared possesses excellent semiconductor properties and is one of the most promising conductive polymer materials.

2 Claims, 1 Drawing Sheet

OTHER PUBLICATIONS

Martin, C. et al. (1993) "Template synthesis of electronically conductive polymers—a new route for achieving higher electronic conductivities" *Synthetic Metals* 55-57: 1165-1170.

Martin, C. et al. (1991) "Template synthesis of polymeric and metal microtubules" *Adv. Mater.* 3:457-459.

Parthasarathy, R. et al. (1994) "Synthesis of polymeric microcapsule arrays and their use for enzyme immobilization" *Nature* 369:298-301.

Penner R. et al. (1986) "Controlling the morphology of electronically conductive polymers" *Journal of the Electronic Society*, pp. 2206-2207.

Van Dyke, L. et al. (1990) "Electrochemical investigations of electronically conductive polymers. 4. controlling the supermolecular structure allows charge transport rates to be enhanced" *Langmuir* 6:1118-1123.

Wei, Z. et al. (2002) "Formation mechanisms of self-assembled polyaniline micro-nanotubes" *Langmuir* 18:917-921.

Wu, C.-G. et al. (1994) "Conducting polyaniline filaments in a mesoporous channel host" *Science* 264:1757-1759.

Wu, C.G. et al. (1994) "Polyaniline wires in oxidant-containing mesoporous channel hosts" *Chem. Mater.* 6:1109-1112.

Zhang, F. et al. (2002) "Conducting polymer nanowires and nanodots made with soft lithography" *Nano Letters* 2:1373-1377.

Zhang, Z. et al. (2002) "Nanostructures of polyaniline doped with inorganic acids" *Macromolecules* 35:5937-5942.

* cited by examiner

METHOD FOR PREPARATION OF POLY(O-PHENYLENEDIAMINE) NANO-BELT

CROSS-REFERENCE TO RELATED APPLICATIONS

This application claims the benefit of Chinese patent application No.: 2004100109212, filed Jun. 15, 2004

FIELD OF THE INVENTION

The present invention relates to a method for preparation of poly(o-phenylenediamine) nano-belt.

BACKGROUND OF THE INVENTION

In recent years, conductive polymers apply in many fields extensively. Polyaniline became one of the most studied conductive polymers due to its good chemical stability and good conductivity. At the same time, polymers based on aniline derivatives attracted wide attentions from the chemical community. Poly(o-phenylenediamine) possesses high aromaticity and high thermal stability. Such kind of conductive polymer was used as the catalyst for electrochemical reduction of dioxygen as well as sensor for many chemical species. Poly(o-phenylenediamine) can be obtained by electrochemical polymerization of monomer o-phenylenediamine or by the chemical oxidative polymerization of monomer o-phenylenediamine.

Since the discovery of carbon nanotube, scientists focused their attention on molecular conductive wire. Conductive polymers possess long conjugation length and good conductivity. They have wide potential applications in the field of molecular conductive wire. Therefore preparation of conductive polymers having 1D structure has not only important theoretical significance but also huge applied value. Zhang et al fabricated conductive polymer nanowire with soft lithography (2000 Nano Lett. 2:1373). Jang et al. prepared polypyrrole nanotube by using inverse micro-emulsion polymerization in non-polar solvent (2003 Chem. Commun. 720). Wan's research group prepared polyaniline and polypyrrole nanotube by using β-naphthalene sulfonic acid as dopant and surfactant (Wan et al., Chinese Patent No. 98109916.5; Wei et al., 2002 Langmuir, 18:917; Zhang et al., 2002 Macromolecules, 35:5937). Alternatively, many research groups used hard template technology such as using porous $Al_2O_3$ etc. as the template to form 1D structure of conductive polymer in the empty space of the template. However, the method has the following drawbacks: it is necessary to perform quite complicated post-synthesis process to remove the templates. At the same time, the 1D structures already obtained might easily be destroyed or be turned into aggregate in the course of their release from the hard template. For example, see following literatures: Martin et al., 1991 Adv. Mater., 3:457; Cai et al., 1989 J. Am. Chem. Soc., 111:4138; Martin et al., 1990 J. Am. Chem. Soc., 112:8976; Cai et al., 1991 Chem. Mater., 3:960; Wu et al., 1994 Chem. Mater. 6:1109; Wu et al., 1994 Science, 264: 1757; Martin et al., 1993 Synth. Met., 55–57:1165; Parthasarathy et al., 1994 Nature, 369:298; Van Dyke et al., 1990 Langmuir, 6:1118; Penner et al., 1986 J. Electrochem. Soc., 133:2206; Cepak et al., 1999 Chem. Mater., 11:1363.

SUMMARY OF THE INVENTION

The present invention provides a method for preparation of poly(o-phenylenediamine) nano-belt comprising mixing aqueous solutions of o-phenylenediamine and of oxidant in a mole ratio of 1:0.1–1 under stirring; standing for 0.5–2 hrs at room temperature; and obtaining poly(o-phenylenediamine) nano-belt.

According to the present invention, o-phenylenediamine is used as the raw material. Preferably, the oxidant is selected from the group consisted of silver nitrate and ferric chloride.

In the absence of template and surfactant, o-phenylenediamine and corresponding oxidant are directly mixed while stirring in the mole ratio of 1:0.1–1 and then is allowed to stand for 0.5–2 hrs and finally a large amount of poly(o-phenylenediamine) nano-belt is obtained. The nano-belt has a length of several hundred micrometers, width of several hundred nanometers and thickness of tens nanometers. The oxidant of silver nitrate can give wider and more uniform poly(o-phenylenediamine) nano-belt than ferric chloride. The method is simple, quick and suitable for large-scale manufacture. The poly(o-phenylenediamine) nano-belt thus prepared possesses excellent semiconductor properties and is one of the most promising conductive polymer materials.

DETAILED DESCRIPTION OF THE PREFERRED EMBODIMENT

EXAMPLES

Example 1

Figure 1:
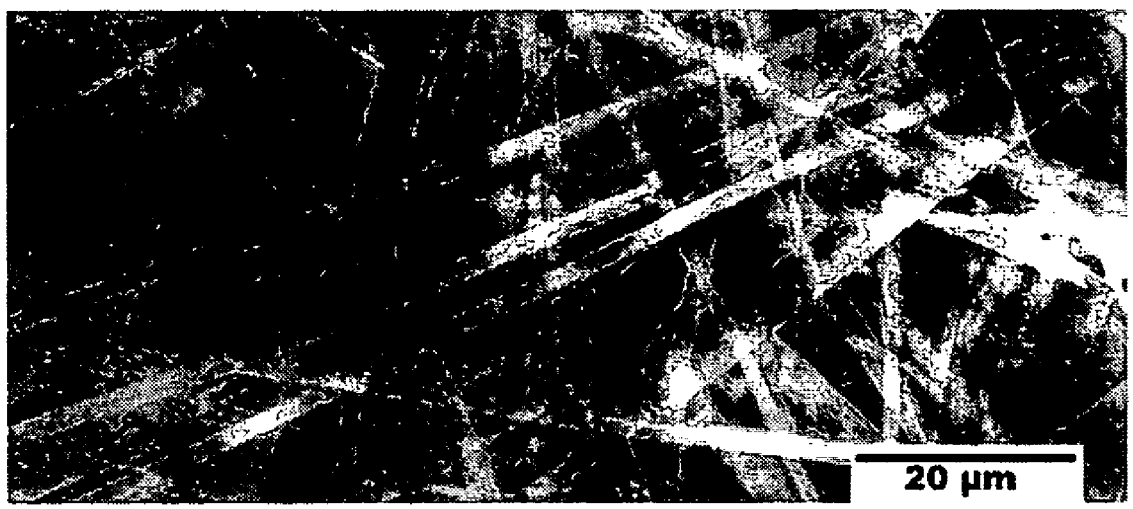
FIG. 1 shows the SEM images of the poly(o-phenylenediamine) nano-belt prepared by mixing aqueous solutions of o-phenylenediamine and of silver nitrate.

4 mL of aqueous solution of o-phenylenediamine in a concentration of 0.072 M was mixed with aqueous solution of silver nitrate in a concentration of 0.12 M in the mole ratio of 1:1 in a small beaker. The mixture was allowed to stand for 1.5 hr at room temperature and large amount of poly(o-phenylenediamine) nano-belt was formed.

Example 2

4 mL of aqueous solution of o-phenylenediamine in a concentration of 0.072 M was mixed with aqueous solution of silver nitrate in a concentration of 0.12 M in the mole ratio of 1:0.5 in a small beaker. The mixture was allowed to stand for 0.5 hr at room temperature and large amount of poly(o-phenylenediamine) nano-belt was formed.

What is claimed is:

1. A method for preparation of poly(o-phenylenediamine) nano-belt comprising
   mixing aqueous solutions of o-phenylenediamine and of oxidant in a mole ratio of 1:0.1–1 under stirring;
   standing for 0.5–2 hrs at room temperature; and
   obtaining poly(o-phenylenediamine) nano-belt.
2. The method according to claim 1, wherein the oxidant is silver nitrate or ferric chloride.

* * * * *